United States Patent [19]

Ely

[11] 4,446,708
[45] May 8, 1984

[54] KEYBOARD LOCK

[76] Inventor: Laurice D. Ely, 660 W. 17th St., Costa Mesa, Calif. 92627

[21] Appl. No.: 338,987

[22] Filed: Jan. 12, 1982

[51] Int. Cl.³ .................... E05B 73/00; B65D 55/14
[52] U.S. Cl. ........................................ 70/166; 70/19; 70/DIG. 72
[58] Field of Search .................. 70/62, 19, 158, 159, 70/160, 161, 162, 163, 164, 165, 166, 167, 168, 169, 170, 171, 172, 173, DIG. 72; 179/189 R

[56] References Cited

U.S. PATENT DOCUMENTS

| | | | |
|---|---|---|---|
| 1,447,374 | 3/1923 | Bowzer | 70/19 |
| 1,819,813 | 8/1931 | Ellenberger | 70/19 |
| 1,971,797 | 8/1934 | Shinn | 70/19 |
| 3,495,050 | 2/1970 | Bert | 70/DIG. 72 |
| 3,953,990 | 5/1976 | Nagel | 70/19 |

FOREIGN PATENT DOCUMENTS

| | | | |
|---|---|---|---|
| 213972 | 8/1960 | Austria | 179/189 R |
| 1013163 | 7/1977 | Canada | 70/167 |

Primary Examiner—Robert L. Wolfe
Attorney, Agent, or Firm—James W. Lucas

[57] ABSTRACT

A locking assembly is provided that can be placed over a push-button keyboard to prevent unauthorized use. The entire keyboard is covered and a tumbler-activating key is inserted externally, rotated and withdrawn. When installed on a telephone, the device allow incoming calls to be received. If pried off of the keyboard to allow emergency use, no major damage would be inflicted to the keys, but the assembly could not be reinstalled without unlocking.

6 Claims, 11 Drawing Figures

KEYBOARD LOCK

BACKGROUND OF THE INVENTION

This invention relates generally to removable locking devices, and more particularly to those adapted for use on push-button keyboards.

Some computer terminals and word processors do not include system locks, and the present invention is intended for use whenever applicable. However, the most widespread need exists in the form of push-button telephone keyboards.

Previous rotating dials lend themselves well to a simple lock in the hole at the number one. There is space behind the rotating portion for retaining the lock, and no other numbers can be dialed unless the "one" passes the raised finger stop.

The typical push-button array is three buttons wide and four buttons high. Since any button can be pushed independent of any other button, the entire array must be covered. There are no undercuts on the buttons, and very little clearance around each one, so the cover seems best held in place by clamping around the buttons.

The telephone instrument itself is generally the property of the telephone company, and should not be damaged through the use of a locking device. It is also desirable that the instrument remain operable as a receiver of incoming calls, even though outgoing calls are prevented.

It is therefore a primary object of the invention to provide a removable lock for push-button keyboards.

Another object is to develop a keyboard lock that can be forced off without damage to the keys.

A further object is to disclose a lock that cannot be re-positioned over a keyboard to disguise previous unauthorized use.

Still another object is to provide a locking assembly that allows the use of standard lock components.

An additional object is the provision of a push-button telephone lock that allows receipt of incoming calls while preventing the placement of outgoing calls.

SUMMARY OF THE INVENTION

The present invention provides a locking assembly for a push-button keyboard. A molded outer casing is open at the bottom and is of sufficient size to cover all of the keys of a standard twelve-key array.

A minimum of two legs extend downward within the casing and into the opening, and are supported at their upper ends. The lower ends of the legs have flanges facing each other, and may be finely serrated along the flange edges. The edges are separated by slightly more than the width of a standard push-button, when in the unlocked position.

One side of the outer casing contains a splined cylindrical opening, which performs the function of the stationary portion of a standard tumbler-type rotating lock. The rotatable barrel containing the tumblers and key-slot is externally accessible, and cooperates with two of the splines to provide two locking positions, either 90° or 180° apart.

The inner end of the rotatable barrel normally has a tapped square boss extending along the centerline. A device can be attached to the end which has a matching square hole, and thus will rotate with the locking barrel. This device can be a circular wedge, a double-lobed cam, or two oppositely mounted shafts parallel to each other and to the axis of the barrel. These devices have a common purpose: to vary the distance between the lower ends of the downwardly extending legs. The legs are held apart mechanically by each of these devices, but the clamping force on the push-buttons is limited through the use of spring members to force them toward each other.

A circular wedge is used in the preferred embodiment, and extends between the pair of movable legs. A pair of longitudinal rods adjacent to both the wedge and the legs translates the 90° rotational motion of the wedge into lateral motion of the leg flanges. The legs are made of a single piece of spring steel, and are preferably of sufficient span to clamp an entire row of push-buttons. The clamping force required for each push-button is thus minimized.

One alternate design uses a double-lobed, or oval-shaped, cam in contact with upper offset portions of the movable legs. Contact is maintained by an arcuate spring positioned across the upper leg portions, pressing them against the cam surfaces. This spring also provides the force clamping the legs over the push-buttons. The locking positions are again 90° apart. This design allows the rotational axis of the locking barrel to be offset from the keyboard area, clearing the receiver of the more compact telephone units.

Another alternate embodiment uses two parallel shafts mounted on opposite sides of the rotational axis of the locking barrel. In this case, the upper ends of the pair of movable legs are pivotally connected to the casing. The locking positions are 180° apart to allow the shafts to exchange positions about the barrel axis. A link connects each shaft to one of the legs at a point intermediate the pivotal connection and the flange at the bottom end. The outer end of each link engages a slot in one of the legs, which are made of spring steel. Each link acts as a connecting rod cooperating with an offset shaft as a crank, and changes the distance between the leg flanges.

Other features of my invention will become more apparent from the following description of the embodiments thereof, as illustrated in the accompanying drawings.

DETAILED DESCRIPTION OF A PREFERRED EMBODIMENT

Although its use is not limited to a telephone keyboard, the preferred embodiment will be described in detail with reference to that usage. In the case of a wall-mounted instrument, or one of the more compact "Princess" style, the locking assembly is slid in from the side, under the receiver and over the keyboard array. The tumbler-activating key is inserted from the side, and is accessible with the receiver in place. The key is rotated 90° and withdrawn, leaving the assembly firmly locked in place over the entire keyboard.

Figure 1:
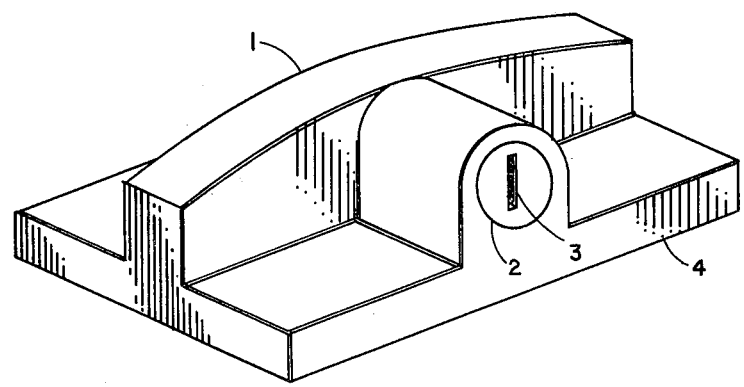
FIG. 1 is a perspective view of the preferred embodiment.
Figure 2:
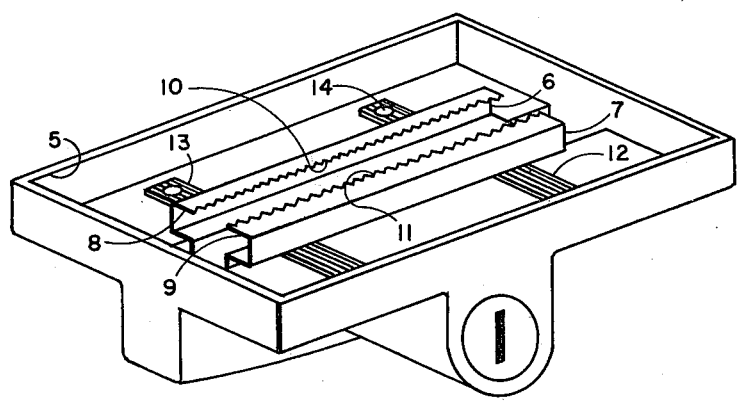
FIG. 2 is a perspective view from underneath the embodiment of FIG. 1.

Referring now to FIG. 1, molded outer casing 1 is shown as it would appear when covering all the push-buttons of a telephone keyboard. Rotatable barrel 2 contains key-slot 3, which is externally accessible from side 4 of casing 1. As shown in FIG. 2, casing 1 is inverted to expose bottom opening 5 and to show movable legs 6 and 7 extending downward into opening 5. End flanges 8 and 9 face each other, and have serrated edges 10 and 11. Flat straps 12 and 13 pass thru slots in the upper portions of legs 6 and 7, best seen in FIG. 6, and are supported by casing 1 when protrusions 14 have heads formed by the application of heat.

Figure 3:
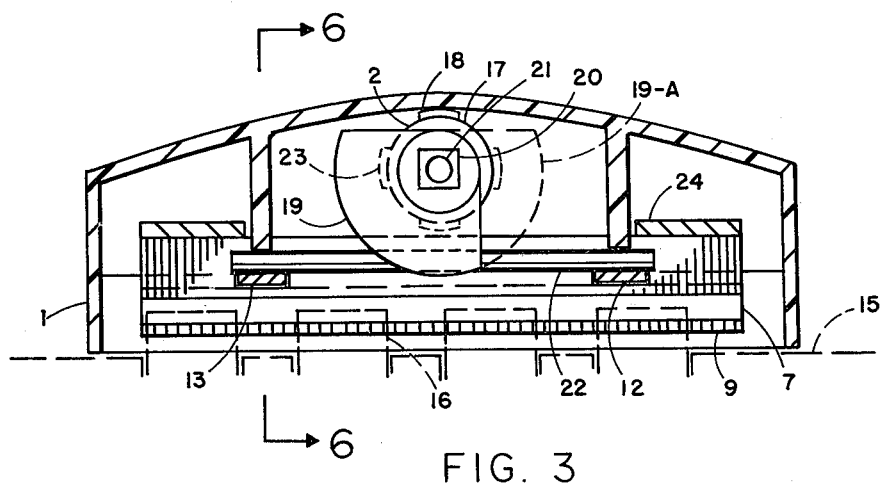
FIG. 3 shows a sectional view through the longitudinal raised portion of FIG. 1, taken along lines 3—3 in FIG. 4.
Figure 4:
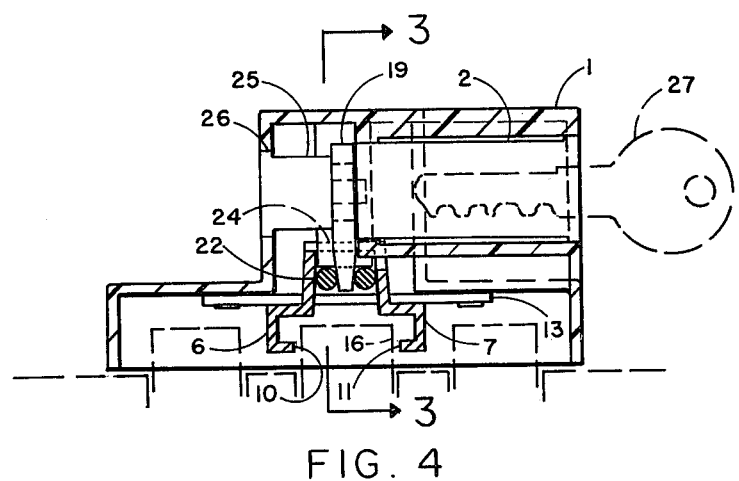
FIG. 4 is a sectional view through the centerline of the locking barrel, showing the assembly in place over a keyboard array but not fastened thereto.
Figure 5:
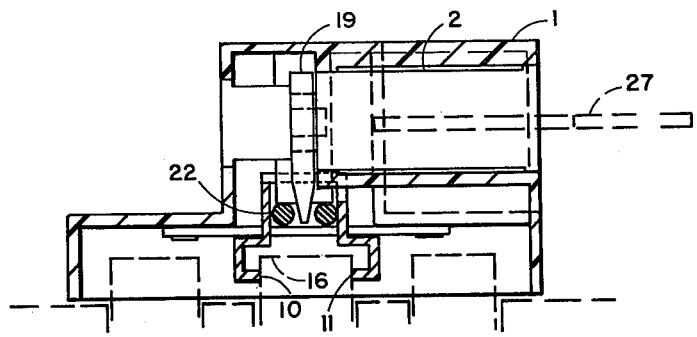
FIG. 5 is the same view as in FIG. 4, but with the barrel locked in the second position, causing the movable legs to engage the central row of push-buttons in the keyboard array.

Turning now to FIG. 3, the locking assembly is shown in place over telephone 15, shown in phantom, and covering the entire keyboard array including typical push-button 16, also shown in phantom. Leg 7 is seen to extend over four push-buttons 16, although effective clamping can result from engagement of only one. Rotatable barrel 2 is supported within cylindrical opening 17, with the tumblers in barrel 2 cooperating with spline 18 in opening 17 when keyslot 3 is aligned as shown in FIGS. 1 and 4. Circular wedge 19 is keyed to barrel 2 thru a square hole that fits tightly around square boss 20 on the inner end of barrel 2, which includes tapped hole 21. In the position shown, wedge 19 has its thick edge between rods 22, holding legs 6 and 7 apart as shown in FIG. 4. When keyslot 3 is rotated 90° clockwise (as seen from outside casing 1), the tumblers engage spline 23 and wedge 19 rotates to position 19-A, shown in phantom. This action causes the thin edge to come between rods 22, as shown in FIG. 5, allowing serrated edges 10 and 11 to clamp the central row of push-buttons 16. The clamping force is supplied by upper web 24, which joins legs 6 and 7 in forming a single piece of spring material. The force is limited to a spring force that will not pull out the push-buttons.

Figure 6:
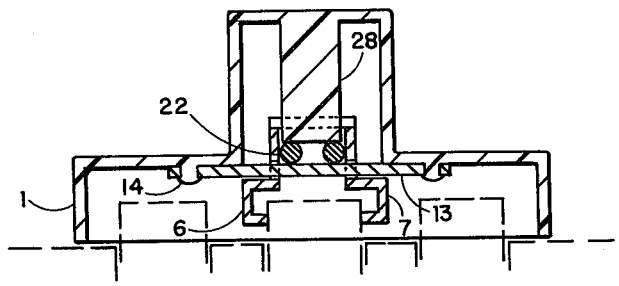
FIG. 6 is a sectional view taken along lines 6—6 in FIG. 3, with the push-buttons engaged as in FIG. 5.

FIG. 4 shows the locking assembly in place over the keyboard, but with serrated edges 10 and 11 disengaged from push-buttons 16. An shown in FIG. 3, the thick edge of circular wedge 19 is holding rods 22 apart, which in turn are spreading legs 6 and 7 apart. Cap 25 is of a cylindrical shape, and has an extension which is press fit into tapped hole 21 to hold wedge 19 onto square boss 20. Casing 1 has a hole 26 in the opposite keyslot 3, to act as a bearing for cap 25. Tumbler-activating key 27 is shown in the vertical position. FIG. 5 shows the rotatable barrel 2 after 90° rotation by key 27. Circular wedge 19 now has its thin edge between rods 22, allowing serrated edges 10 and 11 to clamp the sides of the row of push-buttons 16. FIG. 6 is included primarily to show how flat strap 13 holds the upper portions of legs 6 and 7 in case 1, while retaining rods 22. Guide 28 in case 1 also locates rods 22, and prevents sidewise motion of legs 6 and 7.

Figure 7:
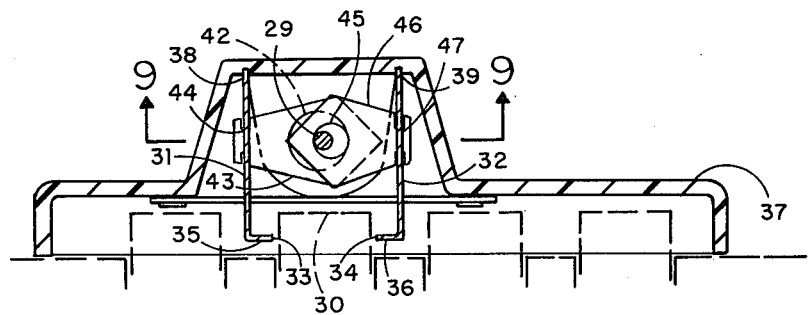
FIG. 7 is a sectional view taken along lines 7—7 in FIG. 9, showing an alternate embodiment of the invention, disengaged from the keyboard.
Figure 9:
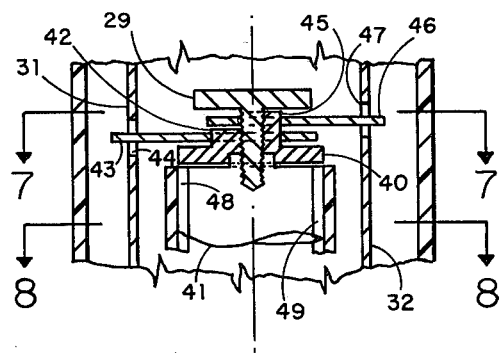
FIG. 9 shows a sectional view of the alternate embodiment, taken along lines 9—9 in FIG. 7.
Figure 8:
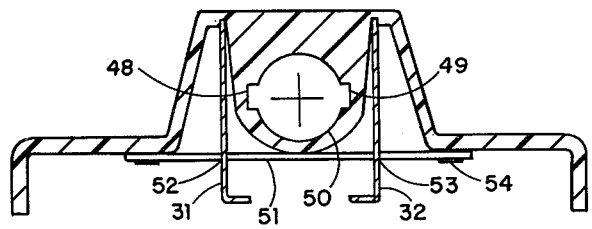
FIG. 8 is another sectional view of the same alternate embodiment, taken along lines 8—8 in FIG. 9.

An alternate embodiment of my invention is shown in FIGS. 7, 8 and 9. In this arrangement, the rotational axis, which is the center of threaded insert 29, is parallel to the row of push-buttons 30 being clamped by movable legs 31 and 32. In order to make the keyslot accessible with the telephone receiver in place, a horizontal row of push-buttons is clamped by serrated edges 33 and 34 on end flanges 35 and 36. Movable legs 31 and 32 are pivotally connected to outer casing 37 at their upper ends 38 and 39. Cam fitting 40, best seen in FIG. 9, includes two oppositely mounted shafts parallel to each other and to the rotational axis of locking barrel 41, also in FIG. 9. Larger shaft 42 acts as a journal for link 43, the outer end of which engages slot 44 in leg 31. Smaller shaft 45 provides a journal for link 46, with its outer end engaging slot 47 in leg 32. Both legs 31 and 32 are made of spring steel and slots 44 and 47 are located at a point intermediate the pivotal connection at upper ends 38 and 39, and end flanges 35 and 36. Rotating barrel 41 through 180° allows the tumblers to cooperate alternately with splines 48 and 49 in cylindrical opening 50 in outer casing 37. Withdrawal of the key thus locks the barrel in either of two positions. As shown in FIGS. 7 and 9, the assembly is positioned over the keyboard but disengaged from the push-buttons. The other locked position clamps serrated edges 33 and 34 against push-buttons 30 with a force controlled by the resilient nature of legs 31 and 32. FIG. 8 shows the relationship between splines 48 and 49, and cylindrical opening 50 more clearly. Legs 31 and 32 are retained vertically by straps 51, which pass thru slots 52 and 53 in legs 31 and 32. These straps are again supported by casing 37 when protrusions 54 have heat-formed heads. Key and slot details not shown are similar to those described in the above preferred embodiment.

Figure 10:
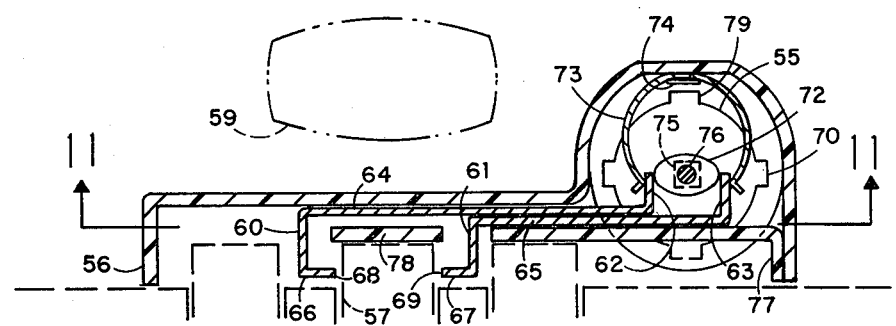
FIG. 10 is a sectional view of a second alternate embodiment, taken along lines 10—10 in FIG. 11, with the push-buttons disengaged.
Figure 11:
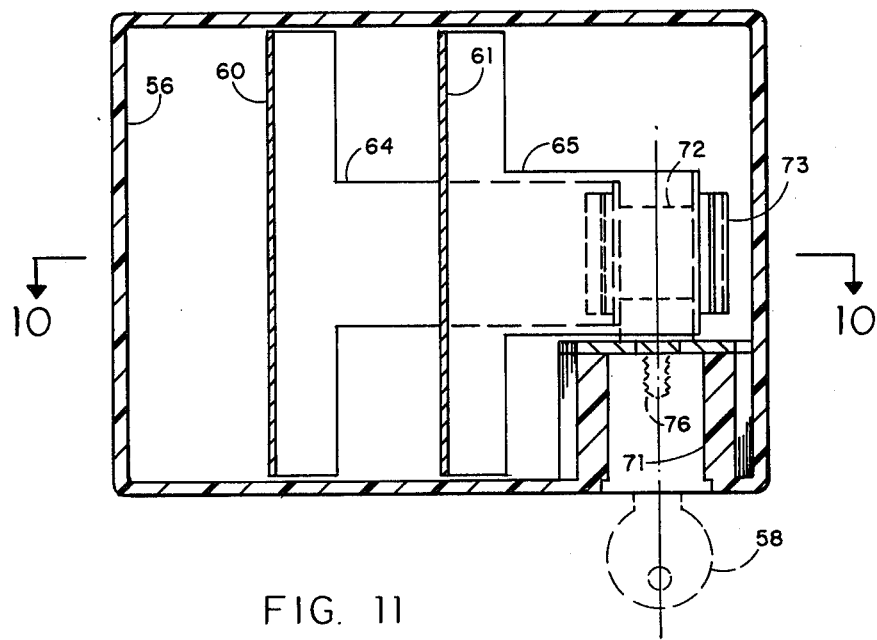
FIG. 11 is a sectional view of the second alternate embodiment, taken along lines 11—11 in FIG. 10.

A final alternate embodiment is shown in FIGS. 10 and 11. In this case, the axis of cylindrical opening 55 in outer casing 56 is parallel to the vertical central row of push-buttons 57. The centerline of key 58, shown in the horizontal, or disengaged, position, is offset from the central push-button row to clear receiver 59, shown in phantom. Movable legs 60 and 61 have upper portions 62 and 63 offset from the lower ends, and are connected through webs 64 and 65. End flanges 66 and 67 have serrated edges 68 and 69 facing each other. Spline 70 is cooperating with the tumblers in rotatable barrel 71 in the position shown. Oval-shaped cam 72 has its long axis horizontal, holding upper portions 62 and 63 apart. Arcuate spring 73 is attached to outer casing 56 by protrusion 74, the head of which has been formed by heat. Spring 73 presses upper portions 62 and 63 against cam 72, and provides the clamping force exerted by serrated edges 68 and 69 against push-buttons 57 when cam 72 is rotated 90°. Cam 72 is indexed to rotatable barrel 71 by fitting tightly over square boss 75. Screw 76 holds the rotating parts together. Bottom plate 77 attaches to three sides of casing 56 and serves to retain web 65. Plate 78 attaches to two opposite sides of casing 56 and retains web 64. When barrel 71 is rotated 90° by key 58, the tumblers withdraw from spline 70 and move to cooperate with upper spline 79, locking the entire assembly in place over the keyboard.

As will be seen from the foregoing, one preferred and two alternate embodiments of my invention have been described in greater detail. Variations will be apparent to those skilled in the art, but which do not depart from the spirit of the disclosure. I therefore wish my invention to be limited only by the scope of the following claims:

I claim:

1. An outer casing having a top and four sides, with one of said sides containing a splined cylindrical opening, at least two movable legs supported by said casing and extending downwardly therein, a locking barrel mounted rotatably to said casing and containing a key-slot accessible from one of said sides, said barrel cooperating with two of said splines to provide two locking positions, said movable legs including a pair with end flanges facing each other, said flanges having serrated edges, said pair of legs being held apart by a circular wedge attached to said barrel and extending therebetween when said barrel is in one of said locking positions, and forced toward each other by spring means when said barrel is in the other of said locking positions, and a pair of longitudinal members adjacent to both said circular wedge and said legs.

2. Claim 1 in which said spring means comprise a single piece of spring material and include said pair of movable legs.

3. An outer casing having a top and four sides, with one of said sides containing a splined cylindrical opening, at least two movable legs supported by said casing and extending downwardly therein, a locking barrel mounted rotatably to said casing and containing a key-slot accessible from one of said sides, said barrel cooperating with two of said splines to provide two locking positions, said movable legs including a pair with end flanges facing each other, said flanges having serrated edges, the inner end of said barrel including two oppositely mounted shafts having a substantially parallel relationship to each other and to the axis of said barrel, the upper ends of said pair of movable legs being pivotally connected to said outer casing, and a link connecting each of said shafts to one of said legs at a point intermediate said pivotal connection and said end flange.

4. Claim 3 wherein said two locking positions are substantially 180° apart, the outer end of each link engaging a slot in one of said legs, said legs being made of a resilient material.

5. An outer casing having a top and four sides, with one of said sides containing a splined cylindrical opening, at least two movable legs supported by said casing and extending downwardly therein, a locking barrel mounted rotatably to said casing and containing a key-slot accessible from one of said sides, said barrel cooperating with two of said splines to provide two locking positions, said movable legs including a pair with end flanges facing each other, said flanges having serrated edges, said pair of legs being held apart by an oval-shaped cam attached to said barrel when said barrel is in one of said locking positions, and forced toward each other by spring means when said barrel is in the other of said locking positions, each of said movable legs having an upper portion offset from said lower end, and said cam being located between said upper portions of said legs and held in contact therewith by said spring means.

6. Claim 5 in which said spring means comprise an arcuate spring member positioned across said upper portions of said legs.

* * * * *